US012224167B2

(12) United States Patent
Jurek et al.

(10) Patent No.: US 12,224,167 B2
(45) Date of Patent: *Feb. 11, 2025

(54) PARTICLE DETECTOR HAVING IMPROVED PERFORMANCE AND SERVICE LIFE

(71) Applicant: ADAPTAS SOLUTIONS PTY LTD, Clyde (AU)

(72) Inventors: Russell Jurek, Clyde (AU); Kevin Hunter, Clyde (AU)

(73) Assignee: ADAPTAS SOLUTIONS PTY LTD, Clyde (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/497,323

(22) Filed: Oct. 30, 2023

(65) Prior Publication Data

US 2024/0063004 A1 Feb. 22, 2024

Related U.S. Application Data

(63) Continuation of application No. 17/040,410, filed as application No. PCT/AU2019/050257 on Mar. 22, 2019, now Pat. No. 11,848,180.

(30) Foreign Application Priority Data

Mar. 23, 2018 (AU) ................................ 2018900978

(51) Int. Cl.
*H01J 43/18* (2006.01)
*H01J 43/10* (2006.01)
(Continued)

(52) U.S. Cl.
CPC .............. *H01J 43/18* (2013.01); *H01J 43/10* (2013.01); *H01J 43/28* (2013.01); *H01J 47/002* (2013.01);
(Continued)

(58) Field of Classification Search
CPC .. H01J 43/18; H01J 43/10; H01J 43/28; H01J 47/002; H01J 47/005; H01J 49/025; H01J 49/288
See application file for complete search history.

(56) References Cited

U.S. PATENT DOCUMENTS 5,446,275 A 8/1995 Sakai et al.
6,351,983 B1 3/2002 Haas et al.
(Continued)

FOREIGN PATENT DOCUMENTS

AU 1259195 A 6/1996
AU 687960 B2 3/1998
(Continued)

OTHER PUBLICATIONS

International Search Report dated Jun. 19, 2019 for corresponding International Patent Application PCT/AU2019/050257 filed on Mar. 22, 2019.
(Continued)

*Primary Examiner* — Nicole M Ippolito
(74) *Attorney, Agent, or Firm* — David D. Brush; Westman, Champlin & Koehler, P.A.

(57) ABSTRACT

Components of scientific analytical equipment. More particularly, ion detectors of the type which incorporate electron multipliers and modifications thereto for extending the operational lifetime or otherwise improving performance. The ion detector may be embodied in the form of a particle detector having one or more electron emissive surfaces and/or an electron collector surface therein, the particle detector being configured such that in operation the environment about the electron emissive surface(s) and/or the electron collector surface is/are different to the environment immediately external to the detector.

20 Claims, 7 Drawing Sheets

(51) Int. Cl.

| | |
|---|---|
| ***H01J 43/28*** | (2006.01) |
| ***H01J 47/00*** | (2006.01) |
| ***H01J 49/02*** | (2006.01) |
| ***H01J 49/28*** | (2006.01) |

(52) U.S. Cl.
CPC .......... *H01J 47/005* (2013.01); *H01J 49/025* (2013.01); *H01J 49/288* (2013.01)

(56) References Cited

U.S. PATENT DOCUMENTS

| | | | |
|---|---|---|---|
| 8,816,272 | B1 | 8/2014 | Brown et al. |
| 11,848,180 | B2 * | 12/2023 | Jurek .................... H01J 47/002 |
| 2002/0041154 | A1 | 4/2002 | Tomasetti et al. |
| 2003/0222579 | A1 | 12/2003 | Habib et al. |
| 2009/0294654 | A1 | 12/2009 | Steiner |
| 2011/0133055 | A1 | 6/2011 | Andrews et al. |
| 2011/0240857 | A1 | 10/2011 | Koetoun et al. |
| 2012/0097847 | A1 | 4/2012 | Nakamura et al. |
| 2012/0112056 | A1 | 5/2012 | Brucker et al. |
| 2013/0033175 | A1 | 2/2013 | Shimoi et al. |
| 2014/0151549 | A1 | 6/2014 | Steiner et al. |
| 2014/0264013 | A1 | 9/2014 | Rafferty et al. |
| 2016/0379809 | A1 | 12/2016 | Badiei et al. |
| 2018/0247803 | A1 | 8/2018 | Brown et al. |

FOREIGN PATENT DOCUMENTS

| | | | |
|---|---|---|---|
| CN | 206471309 | U | 9/2017 |
| JP | S5834044 | U | 3/1983 |
| JP | H05325879 | A | 12/1993 |
| JP | 2011086403 | A | 4/2011 |
| WO | 2016054402 | A2 | 4/2016 |

OTHER PUBLICATIONS

Written Opinion Report dated Jun. 19, 2019 for corresponding International Patent Application PCT/AU2019/050257 filed on Mar. 22, 2019.

English Translation and Chinese Office Action dated May 4, 2023, for corresponding Chinese Patent Application No. 201980021390.1.

Australian Examination Report dated Aug. 1, 2022, for corresponding Australian Patent Application No. 2019239764.

Arenz M. et al: "Commissioning of the vacuum system of the KATRIN Main Spectrometer", Journal of Instrumentation, vol. 11, No. 04, Apr. 7, 2016 (Apr. 7, 2016), pp. P04011-P04011, XP055864434.

English translation and Japanese Office Action dated Nov. 29, 2022, for corresponding Japanese Patent Application No. 2020-551426.

European Office Action dated Apr. 16, 2024, for corresponding European Patent Application No. 19722195.4.

European Supplementary Search Report dated Nov. 24, 2021, for corresponding European Patent Application No. 19722195.4.

* cited by examiner

PARTICLE DETECTOR HAVING IMPROVED PERFORMANCE AND SERVICE LIFE

CROSS REFERENCE TO RELATED APPLICATIONS

The present application is a continuation of U.S. application Ser. No. 17/040,410, filed Sep. 22, 2020, which is a Section 371 National Stage Application of International Application No. PCT/AU2019/050257, filed Mar. 22, 2019, and published as WO 2019/178649 A1 on Sep. 26, 2019, in English, which claims priority from Australian provisional patent application 2018900978, filed Mar. 23, 2018, the contents of which are hereby incorporated by reference in their entireties.

FIELD OF THE INVENTION

The present invention relates to generally to components of scientific analytical equipment. More particularly, the invention relates to ion detectors of the type which incorporate electron multipliers and modifications thereto for extending the operational lifetime or otherwise improving performance.

BACKGROUND TO THE INVENTION

In a mass spectrometer, the analyte is ionized to form a range of charged particles (ions). The resultant ions are then separated according to their mass-to-charge ratio, typically by acceleration and exposure to an electric or magnetic field. The separated signal ions impact on an ion detector surface to generate one or more secondary electrons. Results are displayed as a spectrum of the relative abundance of detected ions as a function of the mass-to-charge ratio.

In other applications the particle to be detected may not be an ion, and may be a neutral atom, a neutral molecule, or an electron. In any event, a detector surface is still provided upon which the particles impact.

The secondary electrons resulting from the impact of an input particle on the impact surface of a detector are typically amplified by an electron multiplier. Electron multipliers generally operate by way of secondary electron emission whereby the impact of a single or multiple particles on the multiplier impact surface causes single or (preferably) multiple electrons associated with atoms of the impact surface to be released.

One type of electron multiplier is known as a discrete-dynode electron multiplier. Such multipliers include a series of surfaces called dynodes, with each dynode in the series set to increasingly more positive voltage. Each dynode is capable of emitting one or more electrons upon impact from secondary electrons emitted from previous dynodes, thereby amplifying the input signal.

Another type of electron multiplier operates using a single continuous dynode. In these versions, the resistive material of the continuous dynode itself is used as a voltage divider to distribute voltage along the length of the emissive surface. A continuous dynode may be a single or multiple channel device. Multi-channel devices may be constructed directly or by combining single channel continuous dynodes, for example by twisting a bundle of single channel dynodes around a common axis to create a single detector.

An additional type of electron multiplier is a cross-field detector. These detectors use a combination of electric fields and magnetic fields perpendicular to the paths of ions and electrons to control charged particle motions. Cross-field detectors may use a discrete or a continuous detector.

A detector may comprise a microchannel plate detector, being a planar component used for detection of single particles (electrons, ions and neutrons). It is closely related to an electron multiplier, as both intensify single particles by the multiplication of electrons via secondary emission. However, because a microchannel plate detector has many separate channels, it can additionally provide spatial resolution.

In a detector, the amplified electron signal impacts on a terminal anode which outputs an electrical signal proportional to the number of electrons which impact it. The signal from the anode is conveyed to a computer for analysis as is well understood in the art.

It is a problem in the art that the performance of electron emission-based detectors degrade over time. It is thought that secondary electron emission reduces over time causing the gain of the electron multiplier to decrease. To compensate for this process, the operating voltage applied to the multiplier must be periodically increased to maintain the required multiplier gain. Ultimately, however, the multiplier will require replacement. It is noted that detector gain may be negatively affected both acutely and chronically.

Prior artisans have addressed the problems of dynode ageing by increasing dynode surface area. The increase in surface area acts to distribute the work-load of the electron multiplication process over a larger area, effectively slowing the aging process and improving operating life and gain stability. This approach provides only modest increases in service life, and of course is limited by the size constraints of the detector unit with a mass spectrometry instrument.

In continuous electron multipliers (CEM) such as channeltrons, prior artisans have attempted to increase emissive surface area by the use of elliptical cross-sections in place of the art-accepted circular design. While an increase in service life was noted, the increase was not proportional to the surface area increase. Accordingly, one or more factors other than surface area appear to have an influence on service life.

It is also a problem in the art that the performance of electron emission-based detectors can degrade more rapidly in gain during the initial stages of their service life. This initial gain loss is sometimes referred to as "burn-in." Prior artisans have addressed this issue by employing an initial intense period of operation so as to rapidly overcome the "burn-in" period before the instrument is used for actual analysis work. While effective, this approach takes time and effort and delays the implementation of a new detector.

It is an aspect of the present invention to overcome or ameliorate a problem of the prior art by providing a—detector having an extended service life, and/or improved performance. It is a further aspect to provide a useful alternative to the prior art.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect, the present invention provides a particle detector having one or more electron emissive surfaces and/or an electron collector surface therein, the particle detector being configured such that the environment about the electron emissive surface(s) and/or the electron collector surface is/are different to the environment immediately external to the enclosure.

In one embodiment of the first aspect, the particle detector is configured so as to allow for user control of the environment about the electron emissive surface(s) and/or the electron collector surface such that the environment about the electron emissive surface(s) is different to the environment immediately external to the enclosure.

In one embodiment of the first aspect, the particle detector comprises an enclosure configured to facilitate establishing and/or maintaining a difference in the environments about (i) the electron emissive surface(s) and/or the electron collector surface and (ii) the environment immediately external to the detector.

In one embodiment of the first aspect, the particle detector comprises means for establishing an environment about the electron emissive surface(s) and/or the electron collector surface which is different to the environment immediately external to the enclosure.

In one embodiment of the first aspect, the particle detector comprises means for user control of the environment about the electron emissive surface(s) and/or the electron collector surface such that the environment about the electron emissive surface(s) is different to the environment immediately external to the enclosure.

In one embodiment of the first aspect, the environment about the electron emissive surface(s) and/or the electron collector surface is different to the environment immediately external to the enclosure with regard to: the presence, absence or partial pressure of a gas species in the respective environments; and/or the presence, absence or concentration of a contaminant species in the respective environments.

In one embodiment of the first aspect, the particle detector is configured to increase or decrease a vacuum conductance thereof compared with a similar or otherwise identical particle detector of the prior art that is not so configured. Preferably the particle detector is configured to decrease vacuum conductance so as to inhibit or prevent the movement of a contaminant from the environment external the detector to the environment to about the electron emissive surface(s) and/or the electron collector surface.

In one embodiment of the first aspect, the particle detector is configured to allow for user control of a vacuum conductance of the particle detector.

In one embodiment of the first aspect, the particle detector is configured to operate such that a gas flowing external to internal the particle detector and/or from internal to external the particle detector does not have the flow characteristics of a conventional fluid.

In one embodiment of the first aspect, the particle detector is configured to operate such that a gas flowing external to internal the particle detector and/or from internal to external the particle detector has the flow characteristics of molecular flow.

In one embodiment of the first aspect, the particle detector is configured to operate such that a gas flowing external to internal the particle detector and/or from internal to external the particle detector has flow characteristics transitional between conventional fluid flow and molecular flow.

In one embodiment of the first aspect, the particle detector is configured to, or comprising means for lowering the pressure internal the particle detector.

In one embodiment of the first aspect, the particle detector is configured to, or comprises means for, lowering the gas pressure internal the particle detector sufficient to alter the flow characteristics of the gas flowing external to internal the particle detector and/or from internal to external the particle detector.

In one embodiment of the first aspect, the particle detector comprises a series of electron emissive surfaces arranged to form an electron multiplier.

In one embodiment of the first aspect, the enclosure is formed from about 3 or less enclosure portions, or about 2 or less enclosure portions.

In one embodiment of the first aspect, the enclosure is formed from a single piece of material.

In one embodiment of the first aspect, the enclosure comprises one or more discontinuities.

In one embodiment of the first aspect, the particle detector, comprises means for interrupting a flow of a gas external the particle detector into one or all of the one or more discontinuities.

In one embodiment of the first aspect, at least one of the one or more discontinuities, or all of the one or more discontinuities, is/are dimensioned so as to limit or prevent entry of a gas external the particle detector into the particle detector.

In one embodiment of the first aspect, at least one of the one or more discontinuities, or all of the one or more discontinuities, is/are no larger than is required for its/their function(s).

In one embodiment of the first aspect, at least one of the one or more discontinuities, or all of the one or more discontinuities, is/are positioned on the enclosure and/or orientated with respect to the particle detector so as to limit or prevent entry of a gas external the particle detector into the particle detector.

In one embodiment of the first aspect, at least one of the one or more discontinuities, or all of the one or more discontinuities has a gas flow barrier associated therewith.

In one embodiment of the first aspect, at least one of the gas flow barriers, or all of the gas flow barriers, is/are configured so as to limit or prevent the linear entry of a gas external the particle detector into the particle detector.

In one embodiment of the first aspect, at least one of the gas flow barriers, or all of the gas flow barriers, comprise one or more walls extending outwardly from the periphery of the discontinuity.

In one embodiment of the first aspect, at least one of the gas flow barriers, or all of the gas flow barriers is/are elongate and/or slender.

In one embodiment of the first aspect, at least one of the gas flow barriers, or all of the gas flow barriers, comprise(s) one or more bends and/or one or more 90 degree bends, In one embodiment of the first aspect, at least one of the gas flow barriers, or all of the gas flow barriers, comprise(s) a baffle In one embodiment of the first aspect, the at least one of the gas flow barriers, or all of the gas flow barriers, is/are formed as a tube having an opening distal to the discontinuity.

In one embodiment of the first aspect, the opening distal to the discontinuity is positioned on the tube and/or orientated with respect to the particle detector so as to limit or prevent entry of a gas external the particle detector into the particle detector.

In one embodiment of the first aspect, at least one of the gas flow barriers, or all of the gas flow barriers is/are curved and/or devoid of corners on an external surface thereon.

In one embodiment of the first aspect, wherein the external surface of the enclosure is curved, or comprises a curve, and/or is devoid of a corner.

In one embodiment of the first aspect, the particle detector comprises an internal baffle.

In one embodiment of the first aspect, the internal baffle interrupts a line of sight through the particle detector.

In one embodiment of the first aspect, the particle detector comprises an input aperture, wherein the input aperture has a cross-sectional area less than about 0.1 $cm^2$.

In one embodiment of the first aspect, the particle detector is configured such that no line of sight through the particle detector exists.

In second a second aspect, the present invention provides a particle detector of any embodiment of the first aspect in functional association with an off-axis input particle optic apparatus, wherein the off-axis input particle optic apparatus is configured to inhibit or prevent the stagnation of a gas about the particle detector.

In one embodiment of the second aspect, the off-axis particle input optic apparatus is configured to allow the substantially free flow of a gas therethrough.

In one embodiment of the second aspect, the off-axis particle input optic apparatus comprises an enclosure, the enclosure comprising one or more discontinuities positioned or orientated so as to prevent the stagnation of a gas about the particle detector and/or allow the substantially free flow of a gas therethrough.

In one embodiment of the first aspect or second aspect, the gas flowing external to internal the particle detector and/or from internal to external the particle detector gas is a particle carrier gas.

In one embodiment of the first aspect or the second aspect, the particle carrier gas is a residual particle carrier gas of a mass spectrometer.

In one embodiment of the first aspect or the second aspect, the particle detector is configured to operate such that a gas flowing external to internal the particle detector and/or from internal to external the particle detector has the flow characteristics of a conventional fluid.

In one embodiment of the first aspect or the second aspect, the particle detector is configured to operate such that a gas flowing external to internal the particle detector and/or from internal to external the particle detector does not have the flow characteristics of molecular flow.

In one embodiment of the first aspect or the second aspect, the particle detector is configured to operate such that a gas flowing external to internal the particle detector and/or from internal to external the particle detector does not have flow characteristics transitional between conventional fluid flow and molecular flow.

In one embodiment of the first aspect or the second aspect, the particle detector is configured to, or comprises means for increasing the pressure internal the particle detector.

In one embodiment of the first aspect or the second aspect, the particle detector is configured to, or comprises means for, increasing the gas pressure internal the particle detector sufficient to alter the flow characteristics of the gas flowing external to internal the particle detector and/or from internal to external the particle detector.

In one embodiment of the first aspect or the second aspect, the particle detector comprises a series of electron emissive surfaces arranged to form an electron multiplier.

In one embodiment of the first aspect or the second aspect, the enclosure is formed from about 2 or more enclosure portions, or about 3 or more enclosure portions.

In one embodiment of the first aspect or the second aspect, the enclosure is formed from a plurality of pieces of material.

In one embodiment of the first aspect or the second aspect, the enclosure comprises one or more discontinuities.

In one embodiment of the first aspect or the second aspect, the particle detector comprises means for facilitating a flow of a gas external the particle detector into one or all of the one or more discontinuities.

In one embodiment of the first aspect or the second aspect, at least one of the one or more discontinuities, or all of the one or more discontinuities, is/are dimensioned so as to facilitate entry of a gas external the particle detector into the particle detector.

In one embodiment of the first aspect or the second aspect, at least one of the one or more discontinuities, or all of the one or more discontinuities, is/are larger than is required for its/their function(s).

In one embodiment of the first aspect or the second aspect, at least one of the one or more discontinuities, or all of the one or more discontinuities, is/are positioned on the enclosure and/or orientated with respect to the particle detector so as to facilitate entry of a gas external the particle detector into the particle detector.

In one embodiment of the first aspect or the second aspect, the particle detector comprises an input aperture, wherein the input aperture has a cross-sectional area greater than about 20 $cm^2$.

In one embodiment of the first aspect or the second aspect, the particle detector is configured such that a line of sight through the particle detector exists.

In one embodiment of the first aspect or the second aspect, where the particle detector is in functional association with an off-axis input particle optic apparatus, the off-axis input particle optic apparatus is configured to facilitate the stagnation of a gas about the particle detector.

In one embodiment of the first aspect or the second aspect, where the particle detector is in functional association with an off-axis input particle optic apparatus, the off-axis particle input optic apparatus is configured to prevent or inhibit the substantially free flow of a gas therethrough.

In one embodiment of the first aspect or the second aspect, where the particle detector is in functional association with an off-axis input particle optic apparatus, the off-axis particle input optic apparatus comprises an enclosure, the enclosure comprising one or more discontinuities positioned or orientated so as to prevent the stagnation of a gas about the particle detector and/or allow the substantially free flow of a gas therethrough.

In one embodiment of the first aspect or the second aspect, the gas flowing external to internal the particle detector and/or from internal to external the particle detector gas is a particle carrier gas.

In one embodiment of the first aspect or the second aspect, the particle carrier gas is a residual particle carrier gas of a mass spectrometer.

In a third aspect, the present invention provides a mass spectrometer comprising the particle detector of any embodiment of the first or second aspect.

In a fourth aspect, the present invention provides a method of designing a particle detector the method comprising the steps of: providing a first physical or virtual particle detector having electron emissive surface(s) and/or an electron collector surface, modifying the first physical or virtual particle detector so as to provide a second physical or virtual particle detector, wherein the step of modifying results in the second physical or virtual particle detector demonstrating (a) a decrease in movement of a contaminant from the environment external the first physical or virtual particle detector to the environment about the electron emissive surface(s) and/or the electron collector surface of the first physical or virtual particle detector compared to the same for the second physical or virtual particle detector, and/or (b) a decrease in the vacuum conductance of the second physical or virtual particle detector compared to the same for the second physical or virtual particle detector.

In one embodiment of fourth aspect, the method comprises the step of fabricating and testing the second physical particle detector for the ability to decrease movement of a contaminant from the environment external the second physical particle detector to the environment about the electron emissive surface(s) and/or the electron collector surface of the second physical particle detector.

In one embodiment of fourth aspect, the method comprises the step of fabricating and testing the first particle detector with regard to the ability to decrease movement of a contaminant from the environment external the first particle detector to the environment about the electron emissive surface(s) and/or the electron collector surface of the first particle detector, and comparing that ability with the same ability of the second particle detector.

In one embodiment of fourth aspect, the method comprises the step of computer modelling and testing the second virtual particle detector for the ability to decrease movement of a contaminant from the environment external the second virtual particle detector to the environment about the electron emissive surface(s) and/or the electron collector surface of the second virtual particle detector.

In one embodiment of fourth aspect, the method comprises the step of computer modelling and testing the first virtual particle detector for the ability to decrease movement of a contaminant from the environment external the first virtual particle detector to the environment about the electron emissive surface(s) and/or the electron collector surface of the first virtual particle detector.

In one embodiment of fourth aspect, the method comprises the step of comparing the results of testing the first virtual or physical particle detector with the results of testing the second virtual or physical particle detector.

In one embodiment of fourth aspect, the method comprises the step of the step of modifying results in a particle detector of any embodiment of the first aspect.

In a fifth aspect, the present invention provides a method of determining a parameter of a particle detector, the particle detector comprising one or more electron emissive surfaces and/or an electron collector surface therein, the method comprising the step of assessing the ability of the particle detector (or a virtual representation of the particle detector) to (a) decrease movement of a contaminant from the environment external the physical or virtual particle detector to the environment about the electron emissive surface(s) and/or the electron collector surface, and/or (b) decrease the vacuum conductance of the physical or virtual particle detector.

In one embodiment of fifth aspect, the parameter is the rate and/or extent of contaminant deposit on one of the one or more electron emissive surfaces, or on the electron collector.

DETAILED DESCRIPTION OF THE INVENTION INCLUDING ILLUSTRATIVE EMBODIMENTS THEREOF

Figure 1:
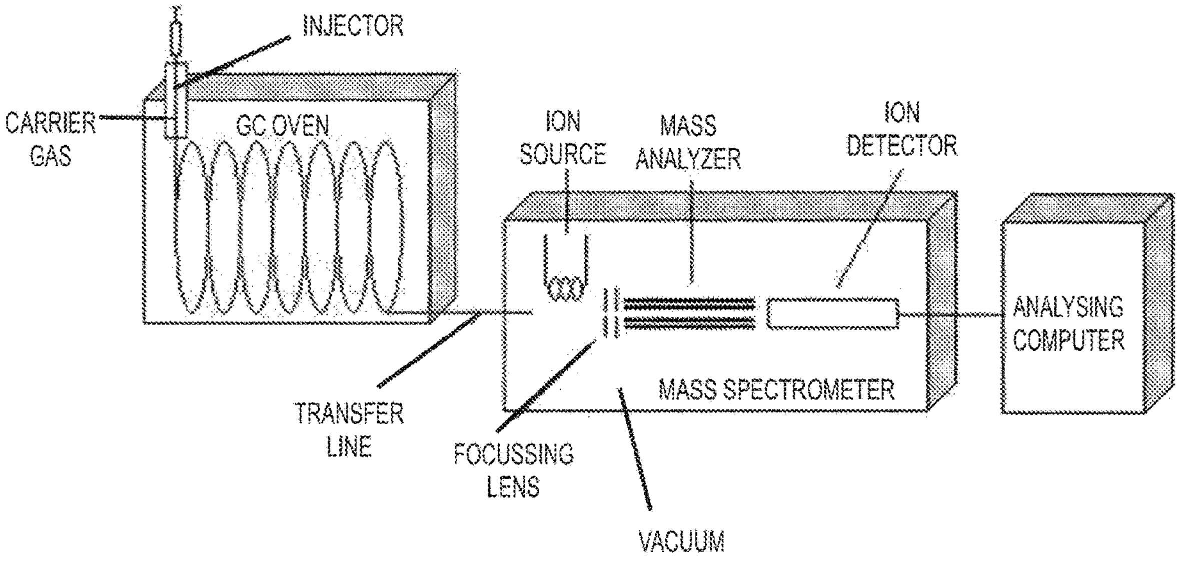
FIG. 1 is a highly schematic block diagram showing a typical prior art arrangement whereby a gas chromatography instrument is coupled to a mass spectrometer. This arrangement may be used with a modified detector according to the present invention.

After considering this description it will be apparent to one skilled in the art how the invention is implemented in various alternative embodiments and alternative applications.

However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

It will be appreciated that not all embodiments of the invention described herein have all of the advantages disclosed herein. Some embodiments may have a single advantage, while others may have no advantage at all and are merely a useful alternative to the prior art.

The present invention is predicated at least in part on the discovery that detector performance and/or service life is affected by the environment in which it is operated. In particular, Applicant has discovered that means for uncoupling the environment internal the detector from the external environment inhibits or prevents the entry of any non-target material present within the vacuum chamber in which the detector operates.

Uncoupling the internal and external detector environments can be accomplished in many ways, some of which are exemplified in this specification by reference to the various types of shielding that may be applied to or about a detector. The shields act in some embodiments to deflect gasses (such as a residual carrier gas) away from the interior of the detector, thereby inhibiting the entry of gas molecules and any associated contaminants. In this way, the electron emissive surfaces and the anodic collector of the detector have reduced exposure to contaminants and therefore have extended service lives or improved performance.

In some embodiments, uncoupling of the internal and external detector environments may be achieved by altering the conductance of gas and other materials (some of which may act as dynode/collector contaminants) under the vacuum established about the detector. At least in some of the preferred embodiments of the present invention, the use of shields to at least partially enclose the electron emissive surface(s) and/or the anodic collector of the detector acts to alter vacuum conductance.

Typically (but not always), it is desired to decrease the conductance of a gas through the internal spaces of the detector. Many embodiments of the present invention having shields or enclosures of some type result in a decrease in conductance of gas through the detector interior. Thus, a residual carrier gas (for example) travelling through the detector is inhibited in its ability to contact internal surfaces of the detector, such as dynode and collector surfaces.

The conductance of gas and other materials into and out of a detector has not been previously considered by prior artisans when designing detectors for use in mass spectrometry and other applications. The vacuum conductance and corresponding coupling (or uncoupling) of the internal and external detector environments are simply not considered in the prior art.

Applicant proposes a range of physical and functional features for incorporation into existing detector design, or alternatively as the bases for de novo detector design. The vacuum conductance of gas or other material into and out of detectors determines how strongly the internal detector environment is coupled to the external environment. The present detectors are configured so as to either decrease or increase the coupling of the two environments, or put another way to increase or decrease the uncoupling of the two environments.

As understood by the skilled person, particle detectors are operated in various pressure regimes. At sufficiently low pressures, the gas inside and outside the detector no longer flows like a conventional fluid and instead operates in either transitional flow or molecular flow. Without wishing to be limited by theory in any way, Applicant proposes that when the internal and external detector environments are operating in transitional and/or molecular flow regimes, it is possible to control the coupling between the two environments.

A number of physical and functional features applicable to detector design allows for the first control of the coupling of the internal and external detector environments. These features elements achieve that end by manipulating the vacuum conductance of the detector.

To decrease the coupling of the external and internal detector environments the features described infra are contemplated to be useful. For example, where the detector is incorporated in a mass spectrometer In some embodiments, the features are intended to alter the flow or pressure of a carrier gas (such as hydrogen, helium or nitrogen) used to conduct sample to the ionization means of the mass spectrometer. Once the sample is ionized, the passage of the resulting ions is under control of the mass analyser, however residual carrier gas continues on beyond the mass analyser and toward the ion detector. In the prior art, no regard is had to the effect of the residual carrier gas on the service life and/or performance of the detector. Applicant has found that the residual carrier gas typically contains contaminants that foul or otherwise interfere with the operation of the dynodes (being the amplifying electron emissive surfaces) of the detector. In addition or alternatively, such contaminants may foul the collector surface of the detector.

Reference is made to FIG. 1 which shows a typical prior art arrangement of a gas chromatography instrument coupled to a mass spectrometer. Sample is injected and mixed with a carrier gas which propels the sample through the separation medium with the oven. The separated components of the sample exit the terminus of the transfer line and into the mass spectrometer. The components are ionized and accelerated through the ion trap mass analyser. Ions exiting the mass analyser enter the detector, with the signal for each ion being amplified by a discrete dynode electron multiplier therein (not shown). The amplified signals are processed with a connected computer. Applicant has been the first to recognize that carrier gas and other materials exiting with the sample components from the terminus of the transfer line enters and contaminates the interior of the interior of the detector, including the electron emissive surfaces and the collector (anode). This has acute negative effects (transiently altering the performance of the detector) but also more chronic negative effects which leads to long term performance deficient and a decrease in detector service life. Having discovered the true nature of the problem, Applicant provides a detector having one or more features which lead to an uncoupling of the environment within the detector from that immediately outside the detector.

As a first feature, the external surface of the detector enclosure may consist of as few continuous pieces as possible. Preferably, the enclosure is fabricated from a single piece of material so as to provide a continuous external surface. This feature may be incorporated into the detector alone, or in combination with any one or more of any other feature of disclosed herein.

The size of any discontinuity in the detector enclosure may be dimensioned so as to be as small (in terms of area) as possible. As used herein, the term “discontinuity” is intended to include any means by which a gas may migrate from external to internal the detector, such as any aperture, grating, grill, vent, opening or slot. Such discontinuities will typically have a function (such as the admission of an ion stream into the detector), and accordingly may be dimensioned to be just large enough to perform the required function, but preferably no larger. In some embodiments, the discontinuity may be larger than the absolute minimum required for proper functioning but may not be more than 1%, 2%, 3%, 4%, 5%, 6%, 7%, 8%, 9%, 10%, 11%, 12%, 13%, 14%, 15%, 16%, 17%, 18%, 19% or 20% larger than the absolute minimum required size. This feature may be incorporated into the detector alone, or in combination with any one or more of any other feature of disclosed herein.

Any discontinuity in the detector enclosure may be oriented or aligned or otherwise spatially arranged to face away from any gas flowing in the external environment of the detector, such as a flow of residual carrier gas present in the mass spectrometer. This feature may be incorporated into the detector alone, or in combination with any one or more of any other feature of disclosed herein.

The external surface of the detector enclosure may use rounded features to create laminar flows and/or vortices from any gas flowing about the environment external to the detector. These laminar flows and/or vortices may provide high gas pressure regions that effectively seal a discontinuity which would other admit residual carrier gas. This feature may be incorporated into the detector alone, or in combination with any one or more of any other feature of disclosed herein.

Any discontinuity in the detector enclosure surface may have an associated gas flow barrier to inhibit the entry of a residual carrier gas. Given the benefit of the present specification, the skilled person is enabled to conceive of a range of contrivances that would be suitable for that function. In some embodiments, the barrier has first and second openings, with one of the openings in gaseous communication with a discontinuity in the detector enclosure (and therefore the environment interior the detector) and the second opening in gaseous communication with environment exterior the detector. The second opening may be distal to the detector so as to be substantially clear of any flow of gas (such as a residual carrier gas). Any one or more of these features may be incorporated into the detector alone, or in combination with any one or more of any other feature of disclosed herein.

In some embodiments, the second opening is still exposed to a flow of gas, however the barrier is configured to prevent or inhibit the entry of the flowing gas to the interior environment of the detector. This end may be achieved by inhibiting or preventing the flow of gas that has entered the barrier, such that less or no gas that has entered flows to the environment internal the detector. For example, Vacuum gas flow barrier may be as long as possible, and/or as narrow as possible, and/or comprise one or more bends or corners; and/or comprise one or more 90 degree bends, and/or comprises internal baffling to minimise internal lines-of-sight. Any one or more of these features may be incorporated into the detector alone, or in combination with any one or more of any other feature of disclosed herein.

A gas flow barrier may be configured or positioned or orientated such that any opening faces away from a gas flows in the environment external the detector such as a flow of residual carrier gas used by a mass spectrometer. This feature may be incorporated into the detector alone, or in combination with any one or more of any other feature of disclosed herein.

A gas flow barrier may comprises rounded exterior surfaces so as to prevent or inhibit any electric discharge. Such rounded surfaces may, in addition or alternatively, create laminar gas flows and/or vortices from a gas flowing in the environment external the detector. These laminar flows and/or vortices may provide high pressure regions that essentially seal off an opening of the shield. This feature may be incorporated into the detector alone, or in combination with any one or more of any other feature of disclosed herein.

Two or more gas flow barriers may be configured or positioned or orientated so as to work together additively or synergistically so as to prevent or inhibit the entry of a gas flowing external the detector into the internal environment of the detector. This feature may be incorporated into the detector alone, or in combination with any one or more of any other feature of disclosed herein.

As a further feature the detector may comprise internal baffling to limit or completely remove any or all internal lines-of-sight through the detector. This feature is generally applicable so long as the optics of particles (such as ions and electrons) are not negatively impacted. This feature may be incorporated into the detector alone, or in combination with any one or more of any other feature of disclosed herein.

A detector will typically comprise an input aperture to admit a particle beam. Applicant has found that such aperture will typically admit significant amounts of residual carrier gas and associated material and in effect couples the detector interior and exterior environments. As discussed elsewhere herein such coupling is undesirable in many circumstances, and accordingly to the extent possible the size of the input aperture should be minimised In some embodiments the input apertures has a cross-sectional area of equal to, or less than about 20 $cm^2$, 19 $cm^2$, 18 $cm^2$, 17 $cm^2$, 16 $cm^2$, 15 $cm^2$, 14 $cm^2$, 13 $cm^2$, 12 $cm^2$, 11 $cm^2$, 10 $cm^2$, 9 $cm^2$, 8 $cm^2$, 7 $cm^2$, 6 $cm^2$, 5 $cm^2$, 4 $cm^2$, 3 $cm^2$, 2 $cm^2$, 1 $cm^2$, 0.9 $cm^2$, 0.8 $cm^2$, 0.7 $cm^2$, 0.6 $cm^2$, 0.5 $cm^2$, 0.4 $cm^2$, 0.3 $cm^2$, 0.2 $cm^2$, or 0.1 $cm^2$. Preferably, the input apertures has a cross-sectional area of equal to, or less than about 0.1 $cm^2$. This feature may be incorporated into the detector alone, or in combination with any one or more of any other feature of disclosed herein.

Where it is desired to increase the coupling between the internal and external detector environments, the cross-sectional area of the input aperture may be increased and in some embodiments may be equal to, or greater than about 1

$cm^2$, 2 $cm^2$, 3 $cm^2$, 4 $cm^2$, 5 $cm^2$, 6 $cm^2$, 7 $cm^2$, 8 $cm^2$, 9 $cm^2$, 10 $cm^2$, 11 $cm^2$, 12 $cm^2$, 13 $cm^2$, 14 $cm^2$, 15 $cm^2$, 16 $cm^2$, 17 $cm^2$, 18 $cm^2$, 19 $cm^2$, or 20 $cm^2$ This feature may be incorporated into the detector alone, or in combination with any one or more of any other feature of disclosed herein.

Where a detector comprises two apertures, it is preferred that the apertures are arranged such that there is no total or partial direct line-of-sight between the apertures. Such arrangement acts to interfere with the free flow of gas through the detector, this in turn preventing or inhibiting entry of the residual carrier gas into the detector. This feature may be incorporated into the detector alone, or in combination with any one or more of any other features disclosed herein.

Where a detector is associated with an off-axis input optic apparatus, such apparatus may incorporate a discontinuity (such as a vents, a grill, an opening or an aperture) to facilitate any gas to flowing through the apparatus, rather than accumulate. This approach prevents or inhibits a localised build-up of gas about the input optics and in a region exterior the detector, with such gas having the propensity to enter the environment interior the detector. This feature may be incorporated into the detector alone, or in combination with any one or more of any other feature of disclosed herein. This feature may be incorporated into the detector alone, or in combination with any one or more of any other feature of disclosed herein.

Each of the features disclosed supra may lead to an uncoupling of the environments internal and external the detector. In some circumstances, it may be desired to more closely couple the two environments, and in which case the teachings with regards to the features supra may be modified so as to accomplish that end. For example, where a barrier is arranged to face away from a residual gas flow so as to uncouple the two environments, the barrier may be arranged to face toward the gas flow so as couple the two environments. As another example, where an aperture is taught to be of minimal size so as to uncouple the two environments, the size of the aperture may be made maximal so as to couple the two environments.

Figure 2:
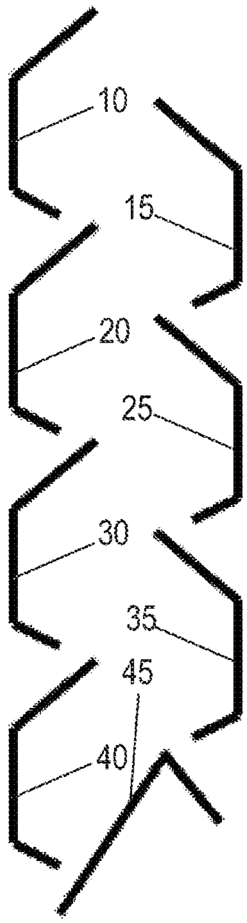
FIG. 2 (PRIOR ART)
FIG. 2 is a highly schematic diagram showing a prior art discrete dynode electron multiplier having a collector anode. The dynodes shown in FIG. 2 (which provide electron emissive surfaces) are fixed in place as shown in the drawing by two planar elements (not shown) that are parallel to each other and also parallel to the drawing page. All multipliers shown in FIGS. 3-8, and 17-22 also implicitly comprise these two planar elements.

Reference is now made to FIG. 2 which shows a prior art detector being in this case a discrete dynode electron multiplier operably coupled to an anodic collector. This prior art detector is presented as a basis for highlighting the novel structures and strategies for uncoupling the internal and external environments of inhibiting the introduction of contaminants into a detector as provided by the present invention. In FIG. 2 there is generally shown a detector of the type useful in the context of a mass spectrometer and having a series of 7 dynodes, each having an electron emissive surface (10), (15), (20), (25), (30), (35), and (40). A collector anode (45) is disposed so as to receive all electrons emitted from the terminal dynode (40).

It will be understood by those skilled in the art that the dynodes shown in FIG. 2 which provide electron emissive surfaces (10), (15), (20), (25), (30), (35), and (40) are fixed in place as shown in the drawing by two planar elements (typically fabricated from ceramic), that are parallel to each other and also to the drawing page. All dynodes in FIG. 2 and related FIGS. 3-8, and 17-22 are understood to be fixed in place by these two parallel elements. These two parallel elements are dimensioned so as to extend beyond the periphery of all dynodes.

Figure 3:
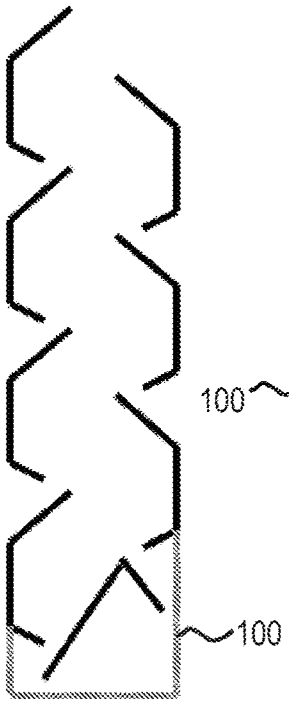
FIG. 3 through FIG. 8 are highly schematic diagrams showing various modifications to the prior art discrete dynode electron multiplier of FIG. 2 having an enclosure forming one or more shields about the dynodes and collector to inhibit the entry of contaminants thereinto.

FIG. 3 shows a detector embodiment of the present invention having an enclosed collector. The enclosure is provided by the shield (100). The edges of the shield contact the terminal and penultimate dynodes, wrapping about the entire periphery of the lower end of the detector.

Figure 4:
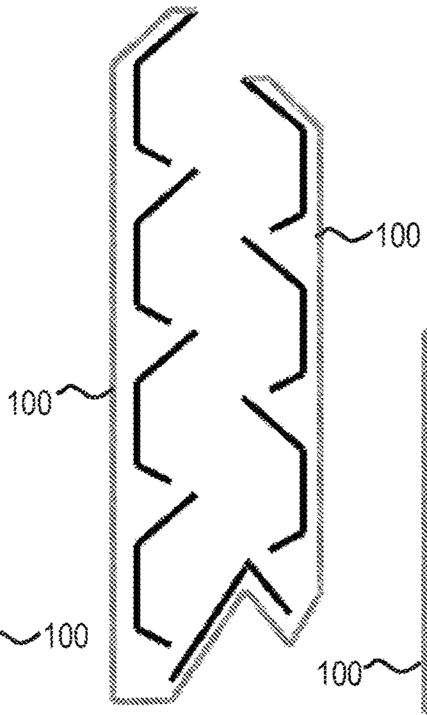

FIG. 4 shows a detector embodiment of the present invention having a more extended enclosure by way of the shield (100). The edges of the shield contact the edges of the first and second dynodes, wrapping about the entire periphery of the detector providing for a significant level of uncoupling between the environment internal the detector to the external environment.

Figure 5:
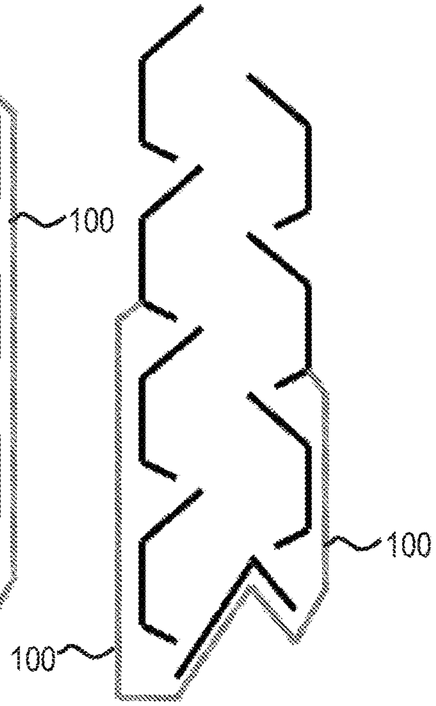

FIG. 5 shows a detector embodiment of the present invention having a level of enclosure intermediate to that of the embodiment of FIG. 3 and FIG. 4, by way of the shield (100). The edges of the shield contact the third and fourth dynodes, wrapping about the entire periphery of the detector.

Figure 6:
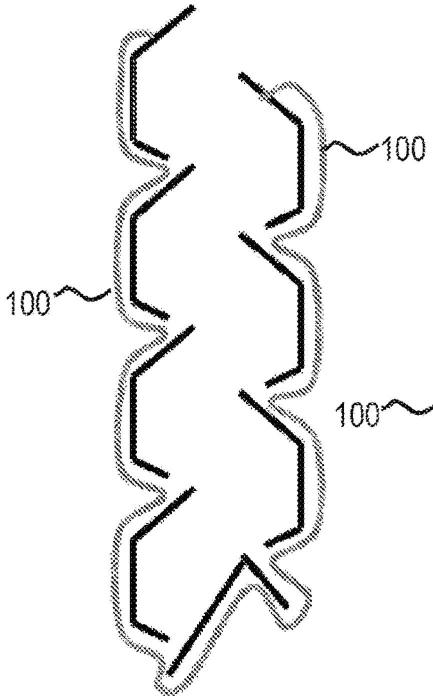
Figure 8:
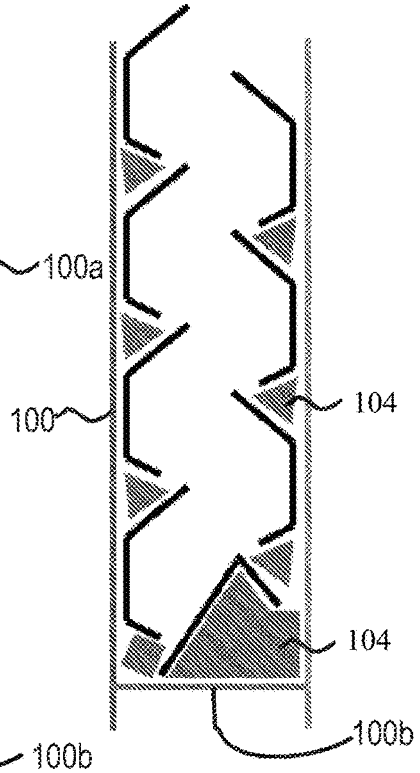

FIG. 6 shows a detector embodiment of the present invention similar to that of the embodiment shown in FIG. 4, except for the shield (100) conforming to the outer surfaces of the dynodes and anode collector. The electron flux generated by an electron multiplier during operation, acts as a pump. Shielding the detector (which acts to lower its vacuum conductance), allows this pumping mechanism to be more effective by requiring pumping the detector interior only, instead of the whole chamber. Using a conformal shield as shown in FIG. 6, or the conformal plugs (as shown in FIG. 8), further reduces the volume that this pumping mechanism must evacuate. For a given pumping speed, this leads to an improved vacuum. This will in turn provide better service life and performance.

Figure 7:
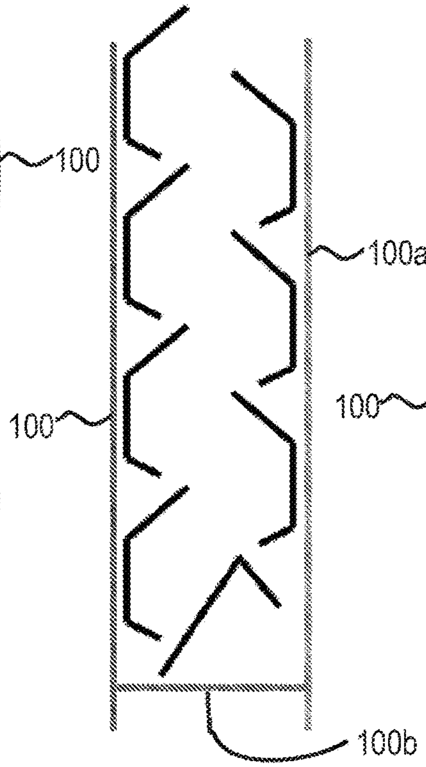

FIG. 7 shows a detector embodiment of the present invention having box-like shield enclosing the detector. The shield is formed from three parts (100), orange (100*a*) and (100*b*) respectively. In this embodiment, the shield makes no contact with and part of the detector. As stated previously in the description of FIG. 2, the detector of FIG. 7 has in fact 2 ceramic faces (not shown) that are parallel to the page. The dynodes are mounted between these ceramic faces. By fixing these three additional parts between these ceramics faces the detector is substantially sealed.

In FIG. 8 there is shown a detector having a shield similar to that shown in FIG. 7, with the addition of conformal plugs (two of which are marked 104) disposed between the outer surfaces of the dynodes and detector, and the inner surface of the shield.

In the previously drawn embodiments, shields were used to enclose or partially enclose various structures of the detector. The following embodiments also utilise shields to uncouple the detector external and internal environments, however do so in a manner which does not require the formation of any enclosure.

Figure 17:
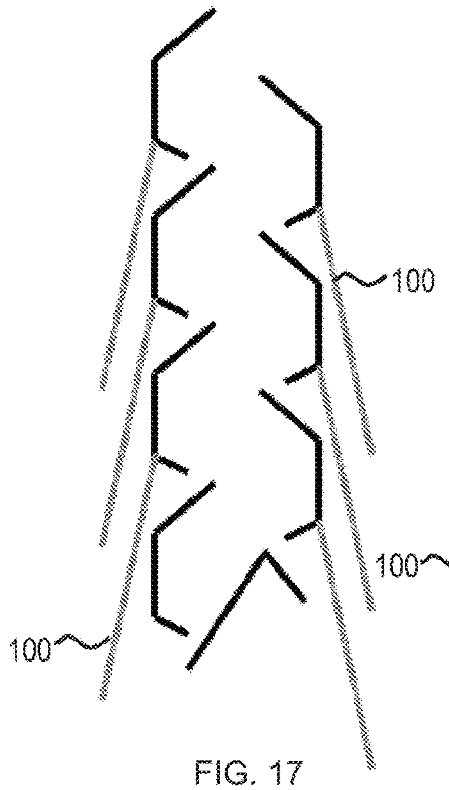
FIG. 17 through FIG. 20 are highly schematic diagrams showing various modifications to the prior art discrete dynode electron multiplier of FIG. 2, the modifications being shields extending from the dynodes, the modifications acting to partially enclose the interior of the detector so as to inhibit the entry of contaminants into the detector.

Referring to FIG. 17, there is shown a prior art discrete dynode detector having shields (two of which are marked 100) extending from the rear (non-emissive) surface of the dynodes. Each of the shields is essentially in the form of a planar member. Residual carrier gas flowing from top to bottom of the drawing is generally deflected away from the spaces between adjacent dynodes by the shields. In this way, gas is less likely to carry contaminants toward the dynode emissive surfaces and the collector.

Figure 18:
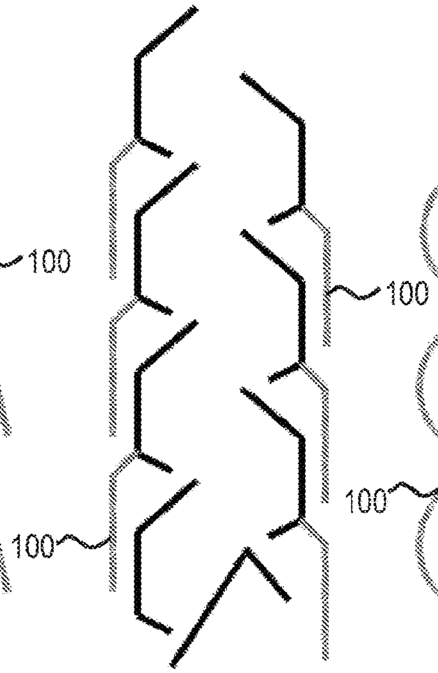

The embodiment of FIG. 18 is similar to that of FIG. 17, with the exception that the shields (two of which are marked 100) comprise a bend so as to more closely conform to the outer surfaces of the detector. This lessens the opportunity (as compared with FIG. 17) for gas to flow from bottom to top and into the detector.

Figure 19:
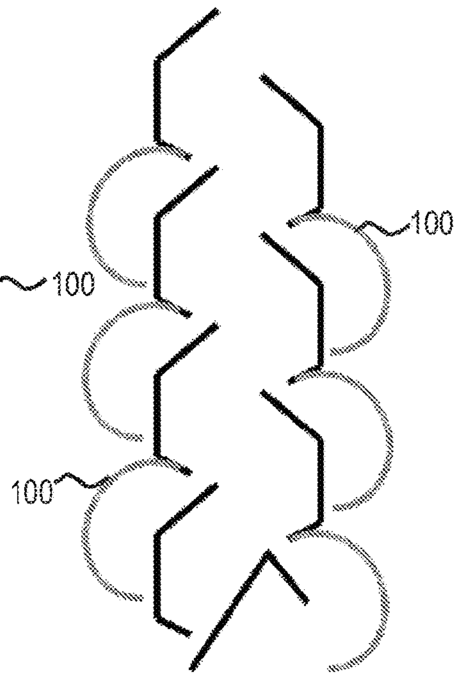
Figure 20:
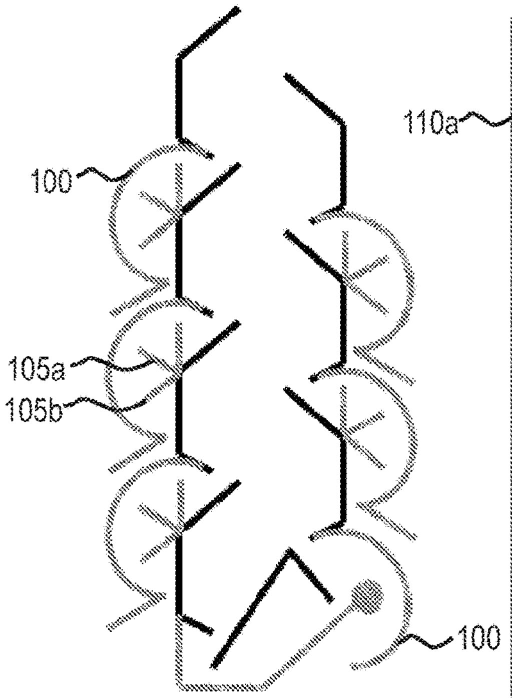

The embodiment of FIG. 19 comprises curved shields (two of which are marked 100) which have a similar effect to the shields of FIG. 18 in inhibiting the retrograde passage of gas into the detector. A variation to that schema is shown in FIG. 20 whereby radial baffles (two of which are marked 105*a*, 105*b*) are disposed within the hollows beneath the curved shields. The embodiment of FIG. 20 further comprises a shield extending across the rear face of the collector, the shield terminating in an expanded region so as to inhibit the entry of gases from the environment proximal to the collector.

Figure 21:
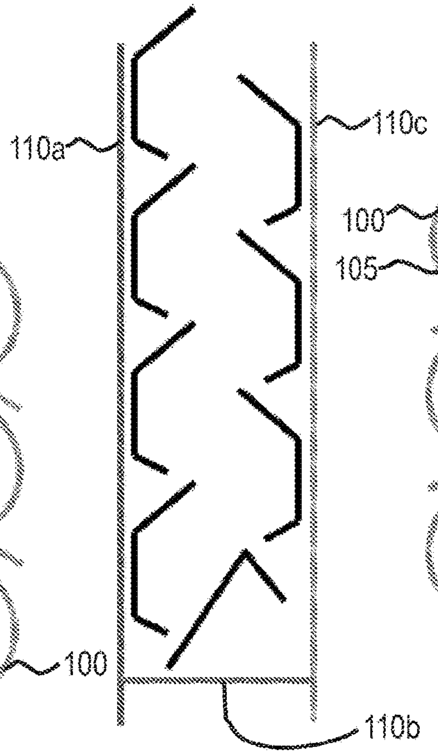
FIG. 21 is a highly schematic diagram showing the prior art discrete dynode electron multiplier of FIG. 2 having a tripartite enclosure acting to partially enclose the interior of the detector so as to inhibit the entry of contaminants into the detector

The embodiment of FIG. 21 comprises a box-like enclosure surrounding the detector, which is formed from three planar components (110*a*, 110*b*, 110*c*). The three planar components may be joined to form a substantially gas-tight enclosure. In this embodiment, the migration of gases external and lateral to the detector and proximal to the collector are prevented from entering and contaminating the dynodes and collector.

Figure 22:
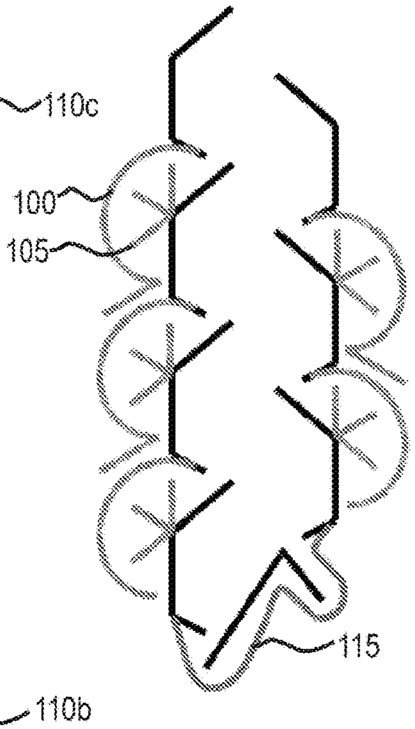
FIG. 22 is a highly schematic diagram showing the prior art discrete dynode electron multiplier of FIG. 2 having shields extending from the dynodes an also a unitary enclosure surrounding the collector, the combination of these features acting to partially enclose the interior of the detector so as to inhibit the entry of contaminants into the detector

The embodiment of FIG. 22 comprises the baffled shields (100, 105) of FIG. 19 in addition to shield (115) dedicated to enclosing the collector.

The shields may be fabricated from any material deemed suitable by the skilled artisan having had the benefit of the present specification. Preferably, the material is one that does not contribute to "virtual leak" in that the material does not substantially desorb a liquid, a vapour or a gas into the chamber under vacuum. Such materials are often termed in the art "vacuum safe". Desorbed substances can have detrimental effects on a vacuum pumping system of an instrument. Exemplary materials include ceramic and vitreous materials.

Figure 9:
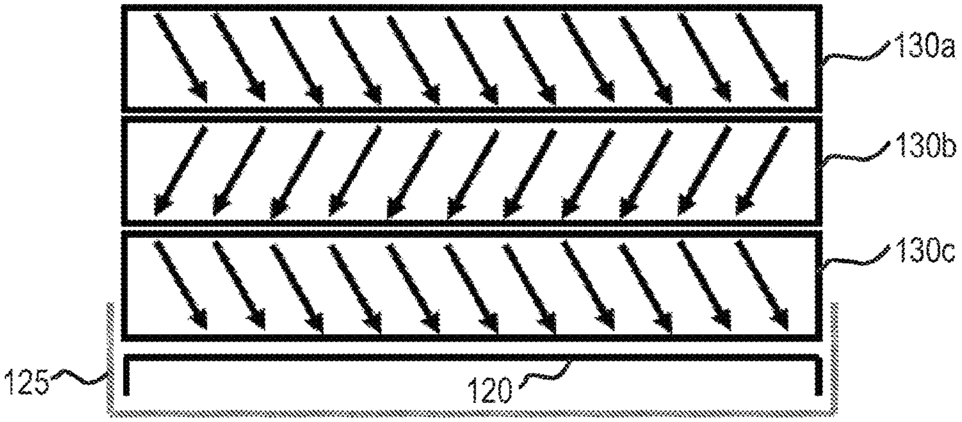
FIG. 9 is a highly schematic diagram showing a microchannel plate detector having an enclosure forming a shield about the microchannel plate stack and the entire collector to inhibit the entry of contaminants thereinto.

The present invention is further applicable to multichannel plate detectors (MCP) as shown in FIG. 9. In this preferred embodiment, the collector (120) is enclosed by a shield (125) so as to provide at least some uncoupling of the environment surrounding the collector. The MCP stack elements (130*a*, 130*b*, 130*c*) remain substantially coupled to the surrounding environment.

Figure 10:
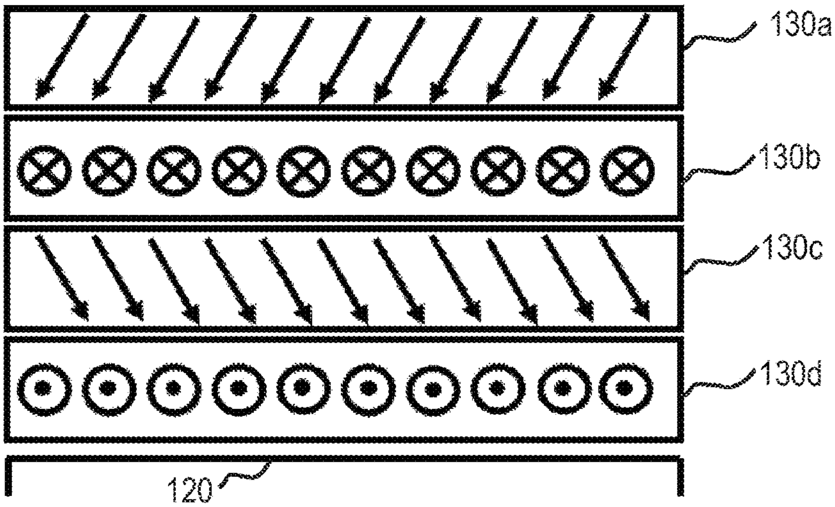
FIG. 10 is a highly schematic diagram showing a microchannel plate detector configured to in itself inhibit the entry of contaminants thereinto.

FIG. 10 shows a MCP detector that has been modified such that each successive stack element (130*a*, 130*b*, 130*c*, 130*d*) is rotated by 90 degrees. The arrows denote the channels in each element of the MCP stack. The x in a circle are arrows pointing into the page. The dot in a circle are arrows pointing out of the page. The channels substantially change direction from one element to the next, so as to provide a tortuous path for any flow of environmental gas from the top of the detector down to the collector. By this arrangement, contaminants in a carrier gas, for example, is less likely to penetrate through the elements to contact the collector.

Figure 11:
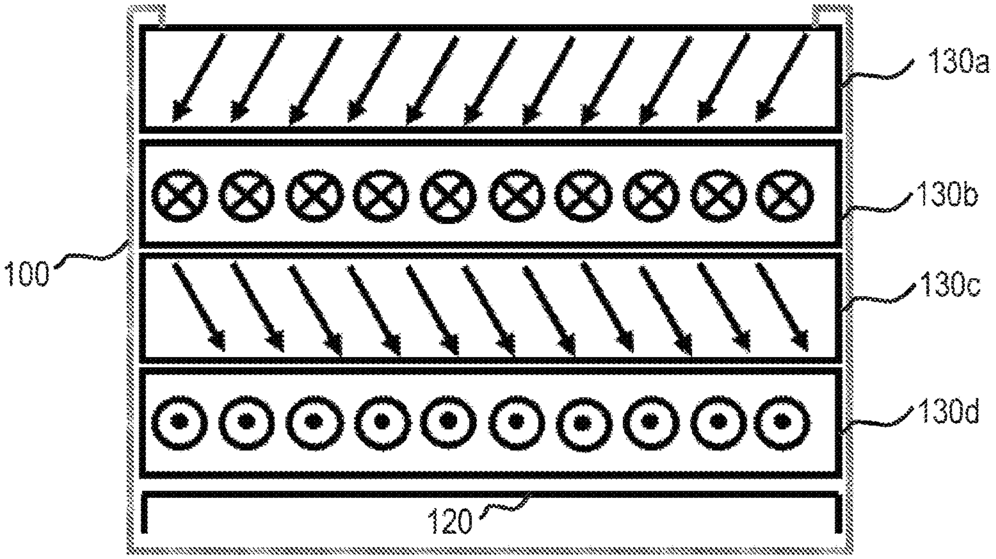
FIG. 11 is a highly schematic diagram showing the microchannel plate detector of FIG. 10 having an enclosure forming a shield about the microchannel plate stack and the collector so as to inhibit the entry of contaminants thereinto.

The embodiment of FIG. 11 provides a greater level of uncoupling from the external environments as compared with the MCP detectors of FIG. 9 and FIG. 10 by providing a unitary shield (110) which encloses the elements and the collector anode. Further levels of uncoupling are provided given that the shield contacts the upper element thereby preventing the flow of a carrier gas downwardly and along the lateral regions of the elements.

Figure 12:
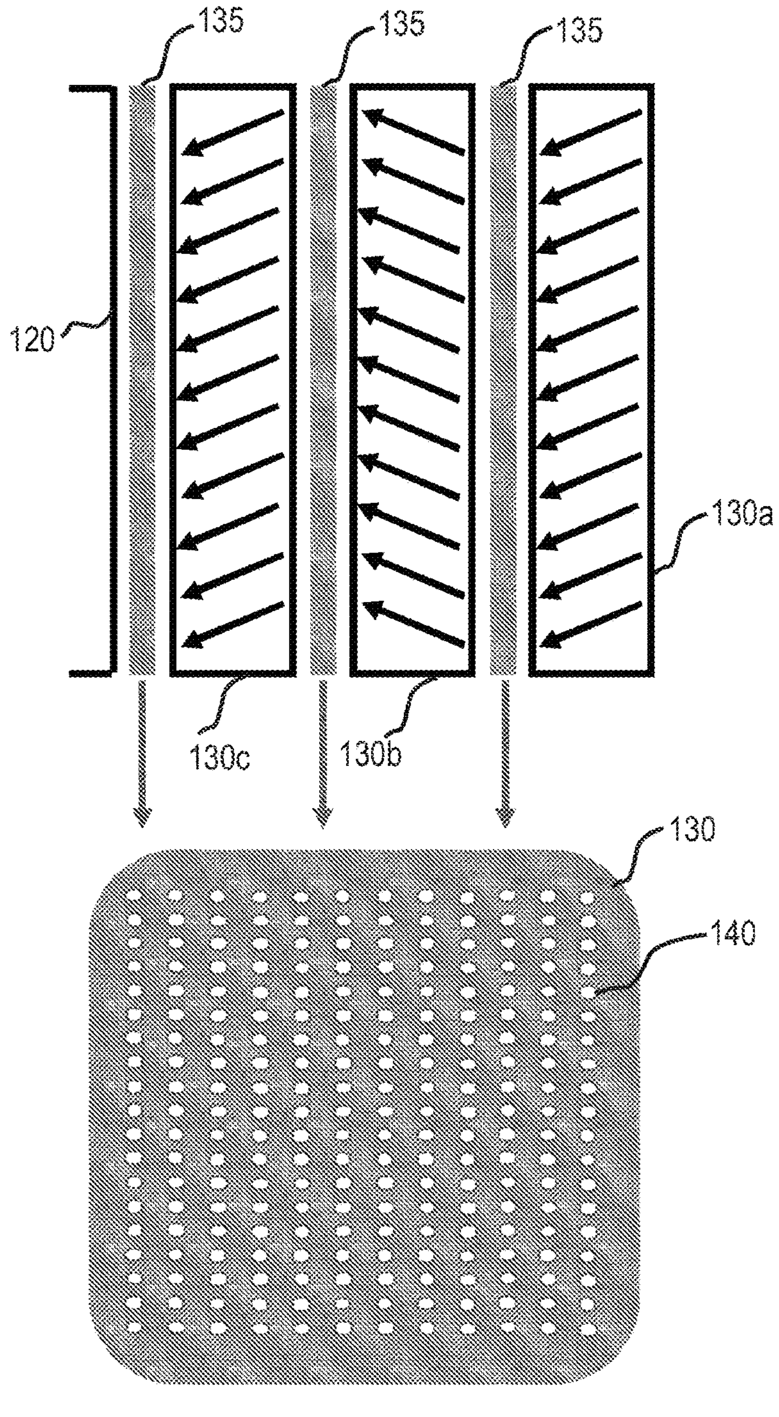
FIG. 12 is a highly schematic diagram showing a microchannel plate detector comprising multichannel pinch point (MPP) elements arranged so as to inhibit the entry of contaminants into the detector.

FIG. 12 shows a modification to a MCP detector having so-called "pinch point" plates (135) being inserted at the interface between two stack elements (130*a*, 130*b*, 130*c*), and also the interface between the terminal element (130*c*) and the collector (120). One of the pinch point plates is show in plan view in the lower part of the drawing. The pinch point plates have a series of apertures (140) being in register with the channel openings of the plate elements. The apertures are of smaller diameter than the channels and whilst allowing the passage of electrons act to inhibit the passage of residual carrier gas for example through the elements and to the anode collector. There may be more than one aperture for each channel in the amplifying elements that bracket the MPP. In this case the pinch points in the MPP are clustered together to line up with the amplifying elements channels. An MCP detector may be made up of 4 or more distinct elements in a stack to minimise vacuum conductance. In the prior art, up to 3 elements are necessary just to achieve required detector gains. To further minimise MCP vacuum conductance at least 4 elements are used with each additional element adding another bend in the path.

Grids and other electron-ion optics elements may be incorporated into the MPP, so as to act as guides or lenses when voltage is applied. This maintains the efficiency of electron transfer between the conventional elements in the MCP stack. This is particularly beneficial when multiple apertures are used for each channel.

Figure 13:
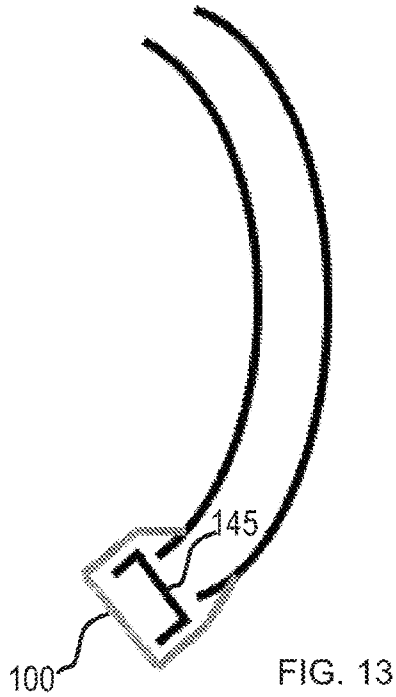
FIG. 13 is a highly schematic diagram showing a detector based on a continuous electron multiplier (CEM) design comprising an enclosure forming a shield around the collector so as to inhibit the entry of contaminants into the detector. The arrangement shown in this diagram is applicable to both single and multi-channel CEMs.

It is contemplated that the present invention is operable also with continuous electron multipliers (CEM), and in that regard reference is now made to FIG. 13. In the preferred embodiment of this drawing, the collector (145) is enclosed by a shield (100), with the edges of the shield contacting the terminal portion of the continuous dynode.

In the context of the present invention, a continuous dynode may be a single or multiple channel device. A multi-channel device of the invention may be constructed directly or by combining single channel continuous dynodes, for example by twisting a bundle of single channel dynodes around a common axis to create a single detector.

Figure 14:
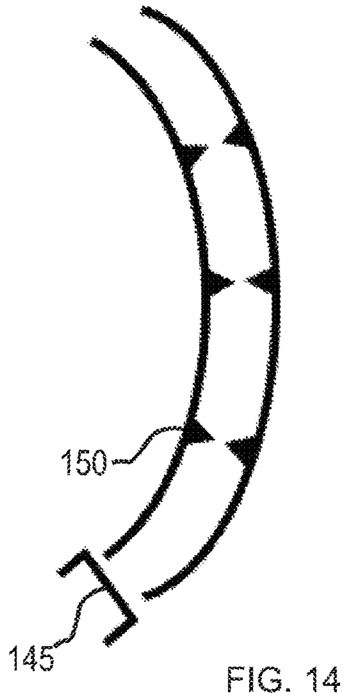
FIG. 14 is a highly schematic diagram showing a detector based on a continuous electron multiplier (CEM) design comprising multiple pinch points (MPP) arranged so as to inhibit the entry of contaminants into the detector. The arrangement shown in this diagram is applicable to both single and multi-channel CEMs.

Another embodiment is in the form of a CEM comprising one or more so-called 'pinch points' to minimise vacuum conductance. A pinch point may be considered as a localised narrowing of the CEM structure. Where multiple pinch points are used they may be arranged serially/sequentially, in parallel or using a combination of both. Reference is made to FIG. 14, whereby the pinch points (150) are represented by solid triangles. These pinch points act to inhibit the flow of gas external to the detector through the void of the continuous dynode, and toward the anode. This arrangement may at least lessen the amount of contaminant which contacts the lower regions of the dynode and also the collector.

Another embodiment is a CEM comprising one or more bends to minimise vacuum conductance; or comprising an enclosed collector to minimise vacuum conductance; or comprising one or more twists about the detector axis to minimise vacuum conductance; or comprising a combination of pinch points, bends, twists and an enclosed collector.

Figure 15:
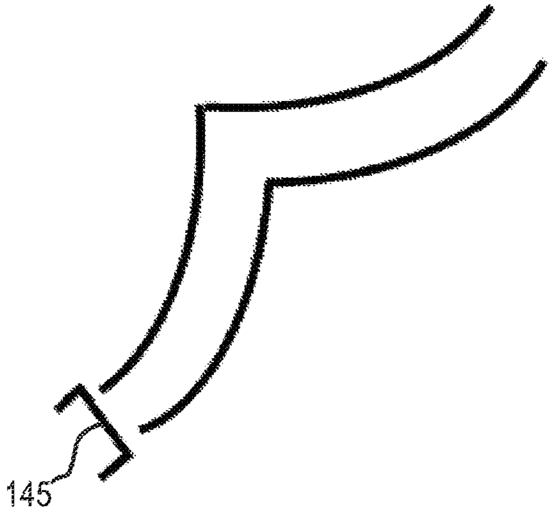
FIG. 15 is a highly schematic diagram showing a detector based on a continuous electron multiplier (CEM) design comprising a bend so as to inhibit the entry of contaminants into the detector. The arrangement shown in this diagram is applicable to both single and multi-channel CEMs.

A further modification to a CEM detector is shown in FIG. 15, whereby a bend is formed in the continuous dynode. The bend is configured geometrically to ensure that secondary electrons rebound from the electron emissive surface of the dynode and toward the collector. At the same time, the bend has the effect of inhibiting the flow of a residual gas through the void of the continuous dynode and toward the collector.

Figure 16:
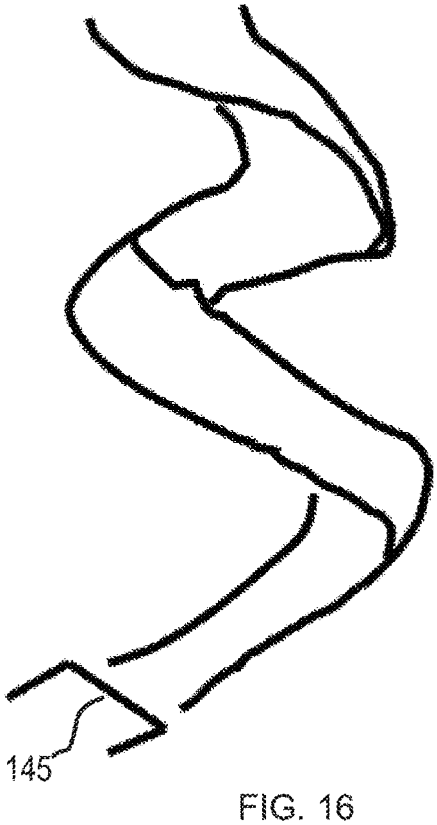
FIG. 16 is a highly schematic diagram showing a detector based on a continuous electron multiplier (CEM) design comprising a twist so as to inhibit the entry of contaminants into the detector. The arrangement shown in this diagram is applicable to both single and multi-channel CEMs.

A similar principal to the embodiments of FIG. 14 and FIG. 15 is shown in the embodiment of FIG. 16, whereby the flow of gas through the continuous dynode is inhibited by the continuous dynode adopting a helical geometry.

As will be appreciated, the continuous dynode embodiments of FIGS. 13 to 16 rely on obviating any straight path along which any residual carrier gas which enters the hollow of the continuous dynode detector may travel. Any deviation from a linear flow will necessarily inhibit flow (whether by the local build-up of pressure, or the establishment of a turbulence, or the deflection of gas back toward an incoming gas flow, or indeed any other means) and as a result lessen the likelihood of a contaminant contact the dynode surface of the collector.

It will be understood that the arrangements shown in each of the diagrams FIGS. 13 through 16 are each applicable to both single and multi-channel CEMs.

Many embodiments of the present invention achieve advantage by controlling the vacuum conductance of a particle detector, which in turn controls coupling of the internal and external detector environments.

Where conductance is altered (increased or decreased) in accordance with the present invention, the level of alteration may be expressed as a percentage of the conductance measured in the absence of a conductance-modulating feature of the present invention. The alteration in conductance may be greater than about 10%, 15%, 20%, 25%, 30%, 35%, 40%, 45%, 50%, 55%, 60%, 65%, 70%, 75%, 80%, 85%, 90%, 100%, 200%, 300%, 400%, 500%, 600%, 700%, 800%, 900% or 1000%.

The skilled artisan understands the concept of vacuum conductance, and is enabled to measure conductance of a detector, or at least the relative conductance of two detectors (i.e. the conductance of one detector compared with another). As an approximation, a detector may be considered as a straight cylindrical pipe or a tube, the conductance of which may be is calculated by reference to the (overall) length (M) and radius (cm) of the pipe. The length is divided by the radius, which provides the L/a ratio, with the conductance (in L/sec, for example) being read off a reference table. The geometry of a detector may be somewhat different to a straight cylindrical pipe or a tube and so the absolute conductance calculated may not be accurate. However, for the purposes of assessing the effectiveness of a conductance-modulating feature of a detector, such approximations will be useful.

A general aim in many circumstances is to reduce the detector vacuum conductance so as to minimise the coupling of the internal and external environments. Without wishing to be limited by theory in any way, this approach may allow for the electron flux of an electron multiplier of a detector to act as a pump, thereby creating a cleaner environment for detector operation. This cleaner internal environment primarily extends the service life of the multiplier. The secondary benefits, depending on how the detector is operated, also include reduced noise, greater sensitivity, increased dynamic range and reduced ion feedback. Reduction in the detector's vacuum conductance limits the impact of a detrimental external environment on detector performance and life. This includes both sustained and acute effects.

A further advantage is in the minimisation the negative effects of detector operation on detector performance and life. Applicant has found that a user's choice of duty cycle, ion input current and mode has an effect on detector performance and to a large extent on detector longevity. Such effects arise due to the vacuum relaxation time, which is the time taken for a substantially perfect vacuum to form inside a detector to equalise with the external environment, Relaxation time is typically consistent with the 'off time' in a duty cycle.

Similarly, it has been demonstrated that the discretised nature of electric charge leads to pseudo off times at typical ion input currents. These pseudo off times can be of the order of the detector vacuum relaxation time at sufficiently low currents, especially when a detector is operated in a time-of-flight (TOF) mode. In TOF mode the analyte ions are collected together in time. The number of different analytes, and their mass distribution, therefore also determines the pseudo off times in TOF mode. By minimising a detector's vacuum conductance, the vacuum relaxation time of the detector is extended. This allows the detector to achieve its intended performance and life over a greater range of duty cycles and ion input currents. Extension of the vacuum relation time also limits the effect of detector operating mode and mixture of analyte ions on detector performance and life.

A further effect of reducing vacuum conductance is to minimise changes in detector calibration due to changes in the external detector environment. This includes both sudden loses in gain due to acute arrival of contaminants, as well as temporary gain recovery due to water molecules reaching the detector surfaces.

Some embodiments of the invention increase the detector's vacuum conductance. Such embodiments are typically used where the environment is beneficial (or at least not detrimental) to the detector performance and life. One example of such a beneficial environment is space. Detectors having a more open architecture are closely coupled to the environment, and accordingly are configured to exploit the natural vacuum available in space. The benefit of this is a reduction in pumping requirements and the associated weight and energy costs.

Increasing the vacuum conductance of a detector reduces the time taken for the internal and external detector environments to reach equilibrium. This allows for rapid pumping of the internal detector environment as the external detector environment is pumped down. This is beneficial for systems that require the shortest possible configuration, set-up or preparation time.

A further application of the present invention is to alternately increase and decrease vacuum conductance of a detector so as to suit a particular circumstance. Accordingly, in some embodiments, conductance-modulating components of the detector are adjusted alternately to increase and decrease vacuum conductance. For example, an aperture may be opened during pump down and venting to maximise vacuum conductance thereby reducing the time taken for the internal and external detector environments to reach equilibrium. Conversely, during operation the aperture may be closed so as to minimise vacuum conductance to increase performance and service life. Mechanisms allowing the opening and closing of an aperture will be apparent to the skilled person having benefit of the present application. For example, an iris arrangement, a hatch arrangement or a sliding covering arrangement may be used to alter the effective size of an aperture or indeed completely seal an aperture. Other arrangements (whether or not reliant on an aperture) will be realizable to the skilled person.

The present invention may be embodied in many forms, and having one or a combination of features which cause or assist in an alteration of vacuum conductance of a detector. The invention may be embodied in the form of: a sealed detector, a partially sealed detector; a detector with one or more gas flow barriers; a detector associated with appropriately designed off-axis input optics that shunts any gas flows present away from the detector; a detector comprising one or more gas flow barriers in association with appropriately designed off-axis input optics that shunts any gas flows present away from the detector; a detector comprising a discontinuity such as a vent, a grill, an opening and/or an apertures to prevent a localised build-up of gas in a detector with a line-of-sight input aperture; a detector comprising one or more gas flow barriers that further comprises a discontinuity such as a vent, a grill, an opening and/or an aperture to prevent a localised build-up of gas in a detector with a line-of-sight input aperture; a detector using adjustable (and preferably movable) gas flow barriers to maximise conductance during pump down, and minimise conductance during operation.

The present detector may be incorporated into any type of sample analysis apparatus where such a detector would be useful. In the context of a complete apparatus, further steps may be taken to uncouple the environment which would normally be about the detector (such environment normally containing relatively high concentration of a residual sample carrier gas) compared with the environment about the detector electron emissive surfaces or an electron collector surface (such environments preferably having a relatively low concentration of a residual sample carrier gas).

In this context, in some embodiments the present detector may be a component of a sample analysis apparatus comprising: an ion source configured to generate an ion from a sample input into the particle detection apparatus, an ion conveyer configured to convey an ion generated by the ion source in a direction away from the ion source, and an ion detector having an input configured to receive an ion generated from an ion source, wherein the sample analysis apparatus is configured such that a sample carrier gas stream comingling with an ion generated by the ion source and flowing in the same general direction as the ion is conveyed, is inhibited or prevented from entering the detector input.

In one embodiment, the sample analysis apparatus comprises ion direction alteration means configured to alter the direction of an ion generated by the ion source and conveyed in a direction away from the ion source, the alteration in direction being sufficient so as to separate the ion from the sample carrier gas or at least decrease the concentration of the sample gas in a space about the ion.

In one embodiment of the sample analysis apparatus the ion direction alteration means acts to deflect the path of an ion generated by the ion source and conveyed in a direction away from the ion source.

In one embodiment of the sample analysis apparatus the deflection is caused by the establishment of a magnetic field about the ion detection alteration means.

In one embodiment, the sample analysis apparatus comprises a gas flow direction alteration means configured to alter the direction of a sample carrier gas stream with which an ion generated by the ion source is comingled, the alteration in direction being sufficient so as to separate the ion from the carrier gas stream.

In one embodiment of the sample analysis apparatus the gas flow direction alteration means forms a barrier or partial barrier to the passage of a gas.

In one embodiment of the sample analysis apparatus the barrier or partial barrier is positioned between the ion source and the detector, and the barrier or partial barrier is configured to allow passage of an ion generated by the ion source but prevent or inhibit the passage of a carrier gas.

In one embodiment of the sample analysis apparatus the barrier or partial barrier acts to deflect a sample carrier gas stream away from the ion detector input.

In one embodiment of the sample analysis apparatus the barrier or partial barrier comprises a discontinuity configured to allow passage of an ion generated by the ion source but prevent or inhibit the passage of a carrier gas.

In one embodiment of the sample analysis apparatus the barrier or partial barrier is substantially dedicated to the purpose of allowing passage of an ion generated by the ion source but preventing or inhibiting the passage of a carrier gas.

In one embodiment, the sample analysis apparatus comprises at least 2, 3, or more barriers or partial barriers, each of the barriers or partial barriers being in at least a partially overlapping arrangement.

In one embodiment of the sample analysis apparatus the detector is configured or positioned or orientated such that an ion generated by the ion source and conveyed along a substantially linear path from the ion source requires deviation from its linear path in order to enter the detector input.

In one embodiment of the sample analysis apparatus the detector is configured or positioned or orientated such that no line of sight is established between the ion source and the detector input.

In one embodiment of the sample analysis apparatus the detector is configured or positioned or orientated such that no line of sight is established between an origin of the sample carrier gas stream and the detector input.

In one embodiment of the sample analysis apparatus the detector input faces away from the ion source In one embodiment, the sample analysis apparatus comprises a vacuum chamber which encloses the ion source and the detector, the vacuum chamber having a chamber outlet port in gaseous communication with a vacuum pump so as to allow a vacuum to be established in the vacuum chamber, wherein the chamber outlet port is configured or positioned or oriented such that when the vacuum pump is in operation a sample carrier gas stream comingling with an ion generated by the ion source and flowing in the same general direction that the ion is conveyed, is drawn toward the chamber outlet port and away from the detector input.

In one embodiment of the sample analysis apparatus a barrier or partial barriers extends between the chamber outlet port and the detector input.

In one embodiment of the sample analysis apparatus the detector is at least partially enclosed so as to prevent or inhibit a sample carrier gas from contacting an electron emissive surface or an electron collector surface of the detector.

In one embodiment of the sample analysis apparatus the detector has one or more associated shields configured to deflect a sample carrier gas stream away from the detector input.

In one embodiment of the sample analysis apparatus comprises a sample inlet port through which a sample carrier gas and sample pass, the sample inlet port configured to direct a stream of sample carrier gas and sample toward the ion generator.

The present invention has been described mainly with reference to particle detectors being discrete dynode detectors, channel electron multipliers and microchannel plates. It is to be appreciated that the invention is not so limited, and other detector arrangements known in the art, and indeed detectors devised in the future are included in the ambit of the present specification.

Similarly, while the present invention has been described primarily by reference to a detector of the type used in a mass spectrometer, it is to be appreciated that the invention is not so limited. In other applications the particle to be detected may not be an ion, and may be a neutral atom, a neutral molecule, or an electron. In any event, a detector surface is still provided upon which the particles impact.

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Functionality may be added or deleted from the diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

What is claimed is:

1. An apparatus comprising:

an electron multiplier comprising a series of electron emissive surfaces comprising a first electron emissive surface configured to receive a particle to be detected by the electron multiplier, and an enclosure extending about one or more of the series of electron emissive surfaces, the enclosure having an opening, wherein the electron multiplier has a long axis about which the series of electron emissive surfaces are disposed, and the enclosure opening is configured to allow a particle to be detected to traverse the long axis and be received by the first electron emissive surface.

2. The apparatus of claim 1, wherein the enclosure extends about most or all of the electron emissive surfaces.

3. The apparatus of claim 1, wherein the enclosure substantially seals the electron emissive surfaces from the surrounding environment, except at the opening.

4. The apparatus of claim 1, wherein the apparatus further comprises a detector configured to receive secondary electrons emitted by a terminal electron emissive surface of the series of electron emissive surfaces, wherein the enclosure extends about the detector.

5. The apparatus of claim 4, wherein the enclosure extends about all of the series of electron emissive surfaces and the detector.

6. The apparatus of claim 5, wherein the enclosure substantially seals the electron emissive surfaces and the detector from the surrounding environment, except at the opening.

7. The apparatus of claim 1, wherein the opening is configured to allow a gas internal the electron multiplier to travel in a linear path that is parallel to the long axis and outwardly through the opening when the electron multiplier is exposed to a vacuum.

8. An apparatus comprising:

an electron multiplier comprising a series of electron emissive surfaces comprising a first electron emissive surface configured to receive a particle to be detected by the electron multiplier, and an enclosure extending about one or more of the series of electron emissive surfaces, the enclosure having an opening, wherein at least a portion of the first electron emissive surface extends beyond an edge of the enclosure opening.

9. The apparatus of claim 8, wherein the enclosure extends about most or all of the electron emissive surfaces.

10. The apparatus of claim 8, wherein the enclosure substantially seals the electron emissive surfaces from the surrounding environment, except at the opening.

11. The apparatus of claim 8, wherein the apparatus further comprises a detector configured to receive secondary electrons emitted by a terminal electron emissive surface of the series of electron emissive surfaces, wherein the enclosure extends about the detector.

12. The apparatus of claim 11, wherein the enclosure extends about all of the series of electron emissive surfaces and the detector.

13. The apparatus of claim 12, wherein the enclosure substantially seals the electron emissive surfaces and the detector from the surrounding environment, except at the opening.

14. The apparatus of claim 8, wherein the electron multiplier has a long axis about which the series of electron emissive surfaces are disposed, and the opening is configured to allow a gas internal the electron multiplier to travel in a linear path that is parallel to the long axis and outwardly through the opening when the electron multiplier is exposed to a vacuum.

15. An apparatus comprising:

an electron multiplier comprising a series of electron emissive surfaces comprising a first electron emissive surface configured to receive a particle to be detected by the electron multiplier, and an enclosure extending about one or more of the series of electron emissive surfaces, the enclosure having an opening, wherein the enclosure has a terminal region adjacent the opening which encircles the first electron emissive surface.

16. The apparatus of claim 15, wherein the enclosure extends about most or all of the electron emissive surfaces.

17. The apparatus of claim 15, wherein the enclosure substantially seals the electron emissive surfaces from the surrounding environment, except at the opening.

18. The apparatus of claim 15, wherein the apparatus further comprises a detector configured to receive secondary electrons emitted by a terminal electron emissive surface of the series of electron emissive surfaces, wherein the enclosure extends about the detector.

19. The apparatus of claim 15, wherein the enclosure extends about all of the series of electron emissive surfaces and the detector, substantially sealing the electron emissive surfaces and the detector from the surrounding environment, except at the opening.

20. The apparatus of claim 15, wherein the electron multiplier has a long axis about which the series of electron emissive surfaces are disposed, and the opening is configured to allow a gas internal the electron multiplier to travel in a linear path that is parallel to the long axis and outwardly through the opening when the electron multiplier is exposed to a vacuum.

* * * * *